Aug. 27, 1963  C. T. M. HALLGREN ETAL  3,101,787
MARKER SHIFTING DEVICE FOR AN AGRICULTURAL IMPLEMENT
Filed Nov. 6, 1961  2 Sheets-Sheet 1

INVENTORS
Carl Thore Marino Hallgren
Anders Gustav Lars Alden
By Paul O. Pippel
Atty.

Aug. 27, 1963  C. T. M. HALLGREN ETAL  3,101,787
MARKER SHIFTING DEVICE FOR AN AGRICULTURAL IMPLEMENT
Filed Nov. 6, 1961  2 Sheets-Sheet 2

INVENTORS
Carl Thore Marino Hallgren
Anders Gustav Lars Alden
By Paul O. Pippel
Atty.

United States Patent Office 3,101,787
Patented Aug. 27, 1963

3,101,787
MARKER SHIFTING DEVICE FOR AN
AGRICULTURAL IMPLEMENT
Carl Thore Marino Hallgren, Norrkoping, and Anders Gustav Lars Alden, Vaderbrunn, Nykoping, Sweden, assignors to International Harvester Company, Chicago, Ill., a corporation of New Jersey
Filed Nov. 6, 1961, Ser. No. 150,520
Claims priority, application Sweden Nov. 17, 1960
9 Claims. (Cl. 172—127)

The present invention relates generally to agricultural implements, and more particularly to grain drills, planters, and the like employing ground-engaging markers.

It is customary to provide implements, such as grain drills, with a pair of laterally extending markers, which form a groove in the earth to guide subsequent passes of the implement over the field being worked. The general purpose of the present invention is to provide an arrangement which will automatically lift the ground-engaging marker at the beginning of the tractor turn at the end of a field, hold both markers in a lifted position during the actual turn, and then drop the opposite marker into ground-engaging position when the turn is completed. In the past implements of this type have been constructed in which the lifting of the markers is controlled by the raising and lowering of the furrow openers. This arrangement has the disadvantage that the furrow openers cannot be lifted during the sowing of a field, without also lifting the row markers. Also, in some prior art devices the shifting of the markers is completed at the time furrow openers are raised, before the tractor turn is completed. In machines utilizing this arrangement, the marker directed toward the outside of the turn will engage the ground during the turn, thereby increasing the danger of colliding with fences or obstructions at the end of a field. It is therefore, the general purpose of the present invention to provide an implement of the type described with means for shifting the markers, which operate independently of the means for lifting furrow openers, and which complete the shifting of the markers only after the tractor has finished its turn.

An object of the present invention is to provide a marker shifting means, which is responsive only to the turning of the tractor relative to the implement.

Another object of the invention is to provide an implement of the type described with marker shifting means, which operate independently of the furrow opener lifting means.

A further object of the invention is the provision of a marker shifting means which will hold both markers in the raised or inoperative position while the tractor is being turned, and which will lower one marker into ground-engaging position when the tractor turn is completed.

Other objects and advantages of the invention will hereinafter become more fully apparent from the following description of the annexed drawings, which illustrate a preferred embodiment, and wherein.

Figure 1:
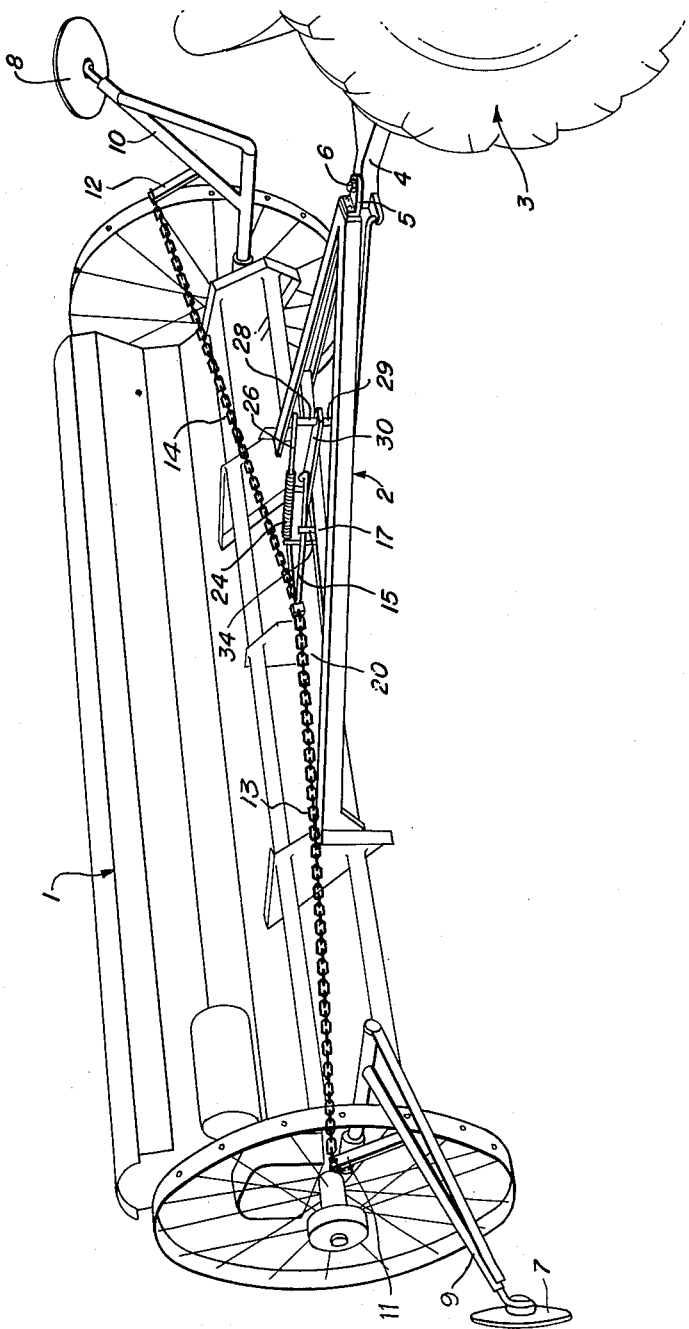
FIGURE 1 is a perspective view of a tractor driven grain drill employing the present invention.

Referring now to the drawings, there is shown in FIGURE 1 a conventional grain drill indicated in its entirety by reference numeral 1. Grain drill 1 is provided with a generally A-shaped hitch structure 2 having a pair of forwardly converging side rail members, and a pair of longitudinally spaced transversely extending beam members. A tractor 3 having a rearwardly extending drawbar 4 is coupled to hitch structure 2 in the conventional manner, by the cooperation of an apertured lug 5 and a bolt 6. Marker disks 7 and 8 are secured to the ends of marker arms 9 and 10, which are in turn pivotally connected to the frame of the grain drill 1. Side arms 11 and 12 are secured to an intermediate portion of marker arms 9 and 10, and extend at substantially right angles thereto. Side arms 11 and 12 are operatively interconnected by transversely extending chain members 13 and 14, which cooperate to simultaneously raise and lower marker arms 9 and 10 into and out of operative position.

A generally fore and aft extending actuating arm 15 is pivotally attached at one end, as by a bolt 16 or the like, to transversely extending hitch structure beam 17. Hitch structure beam 20 has mounted thereon bolt members 18 and 19, which serve as stop means for the free end of actuating arm 15. A rail member 21 is positioned over beam 20 by bolts 18 and 19, and acts as a guide means for the free end of actuating arm 15. Chains 13 and 14 are fastened to actuating arm 15 adjacent the free end thereof, and are of such a length that when actuating arm 15 is in one end position against one of the bolts 18 or 19, one of the markers is in lowered or operative position while the other is in the raised or inoperative position, as is shown in FIGURE 1. The swinging of actuating arm 15 to its other end position causes the shifting of the markers, so that the previously raised marker is lowered and the previously lowered marker is raised.

Figure 2:
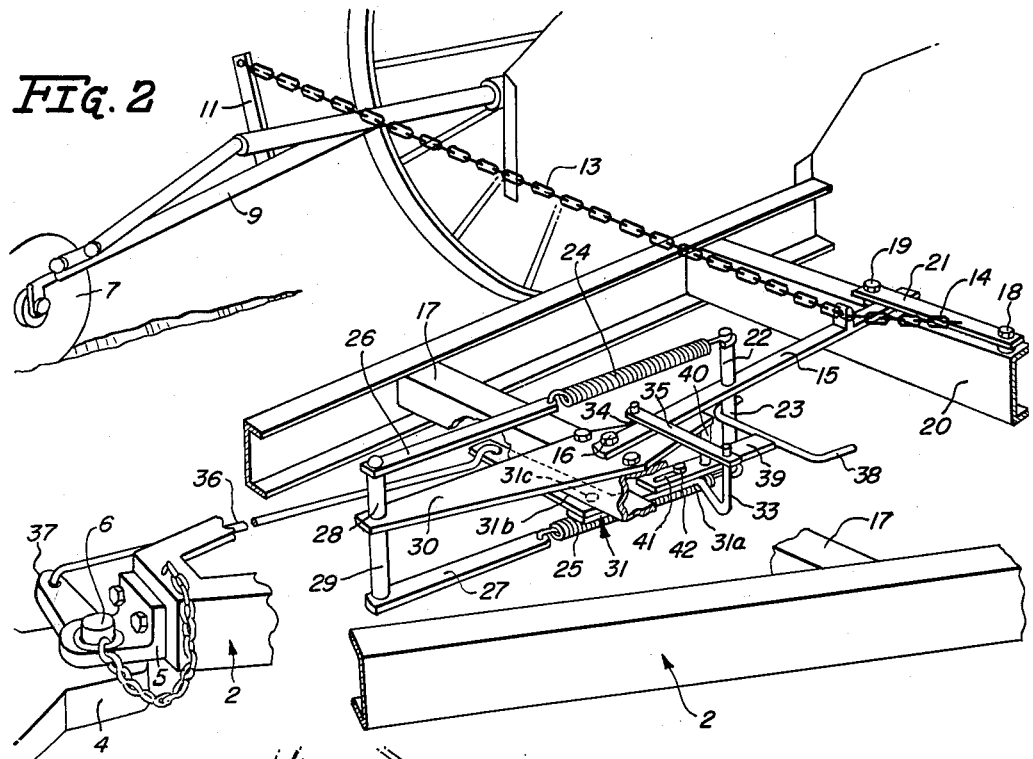
FIGURE 2 is a perspective view, with certain parts broken away for clarity, showing the invention in greater detail with one marker in the lowered or operative position.
Figure 3:
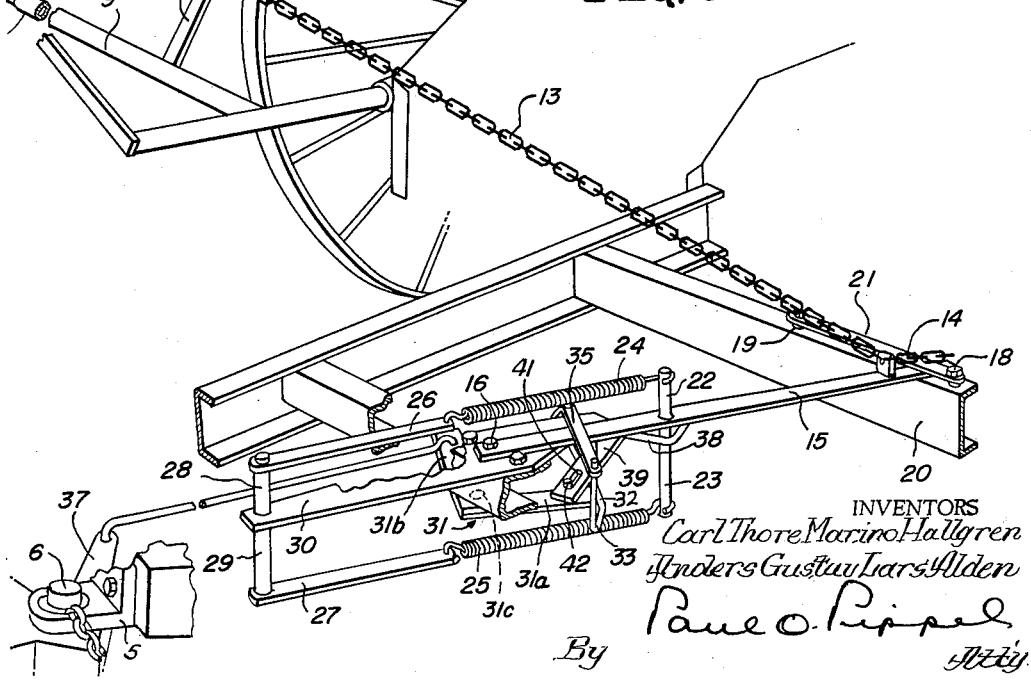
FIGURE 3 is a view similar to FIGURE 2 showing the marker in a raised or inoperative position.

Two oppositely directed vertically extending studs 22 and 23 are affixed to actuating arm 15 at a point between the chain connection and pivot point 16. A generally fore and aft extending plate member 30 is fixedly secured to hitch beam 17, and has mounted thereon two vertically extending oppositely directed studs 28 and 29. As shown in FIGURE 2 and FIGURE 3, studs 28 and 29 are situated in front of the pivot point 16 of actuating arm 15, and are so positioned that they are in line with actuating arm 15, when it is in the central or neutral position, between the end stops 18 and 19. Stud members 22 and 23 serve as anchors for a pair of extension springs 24 and 25, which are secured to studs 28 and 29 by rod members 26 and 27. It will readily be appreciated that springs 24 and 25 resiliently urge arm 15 into one end position, but when the arm 15 is moved from that one end position, through the neutral position, the springs will urge the arm towards the other end position.

A lever member 31, whose arms 31a and 31b extend substantially at right angles to one another, is pivotally connected at 31c to the underside of hitch structure beam 17. Lever arm 31a, which normally points directly rearward from the pivot point, is fitted with a cross piece 32, the ends of which are bent upward and form stop pins 33 and 34. Stop pins 33 and 34, which are disposed on opposite sides of actuating arm 15, are engageable with arm 15 to move it from one of its end positions to the other. A rail 35 connects the upper portions of stop pins 33 and 34, and functions as a guide for actuating arm 15. The distance between stop pins 33 and 34 is such, that when the tractor is driven in a straight line, neither of the pins is in contact with arm 15, but when lever 31 is turned, one of the stop pins strikes the arm to move it through the neutral position.

A longitudinally extending rod 36 interconnects lever arm 31b and arm 37, which extends transversely from tractor drawbar 4, so that lever 31 is pivoted about its connection with hitch structure beam 17, when tractor 3 is turned.

The operation of the marker shifting mechanism will become apparent from an examination of FIGURE 1 and FIGURE 2, where the righthand marker is shown in the lowered or operative position. As the end of the field is approached the tractor operator will turn the tractor to the right, thereby causing drawbar 4 to form an angle with the center line of grain drill 1. Arm 37, therefore, swings rearward and through rod 36, actuates lever 31, so as to swing the lever in a clockwise direction, as viewed in FIGURE 2. Stop pin member 34 will then engage actuating arm 15, so as to swing it from the end position at 19 to the end position at 18, whereby marker arm 9 is raised and marker arm 10 is lowered. When the turn is completed and the tractor 3 is again traveling in a straight line, rod 36 will return lever 31 to its normal position, however springs 24 and 25 will maintain actuating arm 15 in its end position at 18. When the tractor reaches the end of the next row, it will turn to the left whereby rod 36 will pivot lever 31 in a counterclockwise direction, as viewed in FIGURE 2, thereby causing stop member 33 to contact actuating arm 15, and swing it from the end position indicated at 18 to the end position at 19, thereby raising marker arm 10, and lowering marker arm 9.

Although the aforementioned structure is sufficient to shift the implement marker arms, the invention also contemplates the provision of means which will hold both of the markers in the raised or inoperative position, when the tractor is being turned, and which will drop one of the markers into its operative position, when the tractor has completed its turn and is ready to drive ahead in a straight line. To accomplish this, parts are arranged which, during the turning of the tractor, stop arm 15 in an intermediate position where both markers are raised, and which allow arm 15 to continue its movement to the end position only when the tractor is in position for driving straight ahead. To this end a link 39 is provided, which is pivotally connected to a stud 40, which in turn is fixed to plate 30 at a point directly behind the pivot point of lever 31. A yoke 38 is secured to the rearwardly disposed free end of link 39, and has its arms arranged on each side of stud 23, to form a stop means therefor. The portion of link 39 disposed forwardly of stud 40 is provided with a slot 41, in which an upwardly projecting stud 42 on lever arm 31a is slidably received.

It will be understood, that when lever 31 pivots, link 39 will swing around stud 40 in the opposite direction to the movement of lever 31, so that when lever arm 31a and thereby arm 15 is swung to the left, yoke 38 will swing to the right. Stud 23 on actuating arm 15 will then strike against one of the arms of yoke 38, and stud 42 will engage the end of slot 41, as is shown in FIGURE 3, thereby preventing actuating arm 15 from swinging completely over into the end position at 18. As long as the tractor drawbar is at an angle to the center line of the grain drill, arm 15 cannot swing completely over from one end position to the other, and the parts will be in the position shown in FIGURE 3, wherein marker disk 7 is free from the ground, but not completely raised, and marker disk 8 is somewhat, but not completely lowered to the ground. The parts are arranged so that stud 23 will strike against the respective arm of yoke 38 only after arm 15 has passed through its neutral position, whereby yoke 38 restrains the movement of arm 15 against the bias of spring members 24 and 25. It should be pointed out that with the parts in this position the previously lowered marker arm has a shorter lever arm than the other marker arm, so that the weight of the latter will, along with the bias of springs 24 and 25, urge actuating arm 15 into its new end position when the tractor turn is completed.

It should be understood, of course, that the foregoing disclosure relates to only a preferred embodiment of the invention, and that numerous modifications and alterations may be made therein without departing from the spirit and the scope of the invention as set forth in the appended claims.

What is claimed is:

1. A tractor drawn agricultural implement comprising frame means; a pair of markers swingably connected therewith; one of said markers being in a lowered or operative position and the other marker being in a raised or inoperative position when the tractor is driven in a straight line; a flexible member connected to each of said markers; means for swinging said markers into and out of operative position including, a generally fore and aft extending actuating arm pivotally mounted at one end to said frame means and having its other end secured to the generally central portion of said flexible member, a lever pivoted on the frame, means operatively connecting the lever to the tractor for pivoting the lever responsive to turning movement of said tractor, said lever having a part thereon engageable with said actuating arm for movement of said arm between two end positions as the tractor is turned, each end position corresponding to the lowered position of one marker and a raised position of the other marker, and spring means mounted on the frame and operatively connected to said actuating arm so as to continuously urge it into one of its end positions when said tractor is traveling in a straight line.

2. The invention set forth in claim 1 wherein a fore and aft extending rod member is operatively connected to the tractor and to said lever for pivoting the latter and moving to said first lever and associated with said actuating arm so as to swing said arm from one end position to the other as said tractor is turned.

3. The invention set forth in claim 2 wherein said lever has a first lever arm extending substantially fore and aft of said frame and having said part engageable with said actuating arm mounted thereon, said lever having a second lever arm extending substantially at right angles to said first lever arm and having said rod secured thereto, so as to pivot said lever about its connection with said frame when the tractor is turned, thereby causing said part on said second lever arm to contact said actuating arm and swing it from one end position to the other, whereby said lowered marker is swung into its inoperative position, and said raised marker is swung into its operative position.

4. The invention set forth in claim 3 wherein said part engageable with said actuating arm includes a transversely extending cross piece secured to said second lever arm, and at least one member projecting from said cross piece adapted to engage said actuating arm.

5. A tractor drawn agricultural implement comprising frame means; a pair of markers swingably connected therewith; one of said markers being in a lowered or operative position and the other being in a raised or inoperative position when the tractor is driven in a straight line; means interconnecting said markers for alternately swinging said markers into and out of operative position; hitch means connected to said frame means, said hitch means including a pair of forwardly converging side rail members, a pair of longitudinally spaced and transversely extending beam members secured to said rail members, spaced-apart stop members mounted on one of said beam members, an actuating arm pivotally mounted to the other of said beam members and having a part thereon associated with said interconnecting means, said stop members restricting the movement of said actuating arm between two end positions, each end position corresponding to the lowered position of one marker and the raised position of the other marker, and rod means responsive only to turning movement of said tractor operatively connecting the tractor to said actuating arm for swinging it from one end position to the other as said tractor is turned.

6. The invention set forth in claim 5 wherein spring means are mounted on the frame and operatively connected to said actuating arm resiliently urging it into its end position when the tractor is driven in a straight line.

7. In a tractor propelled implement of the type having a frame and a pair of markers swingably mounted on the implement frame, and having means interconnecting said markers, lever means pivotally mounted on said implement frame operatively connected to said interconnecting means for alternately swinging said markers into and out of operative position, motion transmitting means operatively connecting said lever means to the tractor and responsive to the turning of the tractor for actuating said lever means so as to swing one of said markers into operative position while the other marker is swung into inoperative position, and means mounted on the frame and associated with said lever means for controlling the movement of said markers so as to allow both of the markers to be in the inoperative position when the tractor is being turned, and automatically shifting one of said markers into operative position when the turn is completed.

8. The invention set forth in claim 7 wherein the lever means associated with said interconnecting member includes an arm pivotally mounted at one end on said implement frame, and having its other end secured to said interconnecting member, and a cross piece mounted transversely of and secured to said lever means having at least one part thereon engageable with said arm for movement thereof from one end position through a neutral position into a second end position.

9. The invention set forth in claim 8 wherein said marker movement controlling means includes a link pivotally secured to said frame, said lever means having means constraining said link for swinging movement in the opposite direction as said lever means, said link having at least one part thereon engageable with said arm after said lever part has swung said arm from one end position through the neutral position, said link part restraining said arm for movement into the other end position until the tractor has completed its turn.

No references cited.